US010595055B2

(12) United States Patent
Jindal et al.

(10) Patent No.: US 10,595,055 B2
(45) Date of Patent: Mar. 17, 2020

(54) SERVER-SIDE INSERTION OF MEDIA FRAGMENTS (71) Applicant: Amazon Technologies, Inc., Seattle, WA (US)

(72) Inventors: Tarun Jindal, Seattle, WA (US); Ron Searl, Seattle, WA (US); Kyle Alexander Woo, Kent, WA (US); Abhishek Kumar, Redmond, WA (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 15/960,186

(22) Filed: Apr. 23, 2018

(65) Prior Publication Data
US 2019/0327504 A1 Oct. 24, 2019

(51) Int. Cl.
*H04N 21/234* (2011.01)
*H04N 21/81* (2011.01)
*H04L 29/06* (2006.01)
*H04L 29/08* (2006.01)

(52) U.S. Cl.
CPC ..... *H04N 21/23424* (2013.01); *H04N 21/812* (2013.01); *H04L 65/608* (2013.01); *H04L 67/02* (2013.01)

(58) Field of Classification Search
CPC ............ H04N 21/23424; H04N 21/812; H04L 65/608; H04L 67/02
See application file for complete search history.

(56) References Cited

U.S. PATENT DOCUMENTS

| 9,066,115 | B1* | 6/2015 | Cherry | H04N 21/23424 |
| 9,948,740 | B1 | 4/2018 | Benson et al. | |
| 2012/0278725 | A1* | 11/2012 | Gordon | H04N 21/2665 715/738 |
| 2013/0198770 | A1* | 8/2013 | Xiong | H04N 21/654 725/25 |
| 2013/0275557 | A1 | 10/2013 | Myers et al. | |
| 2016/0164841 | A1* | 6/2016 | Mikhailov | H04N 21/2541 726/12 |
| 2017/0339114 | A1* | 11/2017 | Watson | G06F 21/64 |

FOREIGN PATENT DOCUMENTS

CN 108 668 145 10/2018

OTHER PUBLICATIONS

PCT International Search Report and Written Opinion dated Jun. 6, 2019, issued in Application No. PCT/US2019/025977.

* cited by examiner

*Primary Examiner* — Nicholas T Corbo
(74) *Attorney, Agent, or Firm* — Weaver Austin Villeneuve & Sampson LLP (57) ABSTRACT

Techniques are described for providing media presentations that include content originating from multiple sources in ways that are effectively transparent to end user devices. Manifest data provided to an end user device include a key encoded in the URL for each of the content fragments. The key encodes one or more interstitial periods of secondary content within the overall presentation of primary content. When a media server receives a content request from the end user device, the media server determines from the key encoded in the URL and the range of content requested whether the request corresponds to the primary content or the secondary content.

20 Claims, 5 Drawing Sheets

Quality: 4K UHD

Fragment A: htttps://www.example.com/content/primary-content.ism?URL-key/byte-range0.dash
Fragment B: https://www.example.com/content/primary-content.ism?URL-key/byte-range1.dash
Fragment X: https://www.example.com/content/primary-content.ism?URL-key/byte-range2.dash
Fragment Y: https://www.example.com/content/primary-content.ism?URL-key/byte-range3.dash
Fragment C: https://www.example.com/content/primary-content.ism?URL-key/byte-range4.dash
Fragment D https://www.example.com/content/primary-content.ism?URL-key/byte-range5.dash

...

Quality: 1080P

Fragment A: https://www.example.com/content/primary-content.ism?URL-key/byte-range0.dash
Fragment B: https://www.example.com/content/primary-content.ism?URL-key/byte-range1.dash
Fragment X: https://www.example.com/content/primary-content.ism?URL-key/byte-range2.dash
Fragment Y: https://www.example.com/content/primary-content.ism?URL-key/byte-range3.dash

SERVER-SIDE INSERTION OF MEDIA FRAGMENTS

BACKGROUND

Media content is increasingly delivered to end user devices over data networks using an array of streaming technologies. Providers of streaming content services want to be able to support a wide range of end user devices having wide ranging capabilities and many different types and versions of media players. New streaming techniques are constantly being developed, but are often not supported by older or less capable devices or media players. So, if content service providers want to be able to provide content to such devices or players in a way that takes advantage of such new techniques, they need to be able to find ways around these limitations.

For example, a content service provider might want to provide a video-on-demand (VOD) presentation that includes content originating from more than one source, e.g., a movie with inserted ad content. However, many older media players may not be able to handle content that originates from more than one source.

DETAILED DESCRIPTION

This disclosure describes techniques for providing media presentations that include content originating from multiple sources in ways that are effectively transparent to end user devices. Manifest data are provided to an end user device to allow the device to generate properly formatted requests for the content fragments of the presentation. The manifest data include a key that is encoded in each uniform resource locator (URL) for each of the content fragments represented in the manifest data. The key encodes information about the way in which secondary content (e.g., advertising content) is integrated with primary content (e.g., a movie). According to a particular class of implementations, the key identifies one or more interstitial periods of the secondary content within the overall presentation of primary content. When a media server (e.g., an edge server of a CDN) receives a content request from the end user device, the media server determines from the key encoded in the URL and the range of content requested whether the request corresponds to the primary content or the secondary content. The media server can then handle the request accordingly. An example will be instructive.

Figure 1:
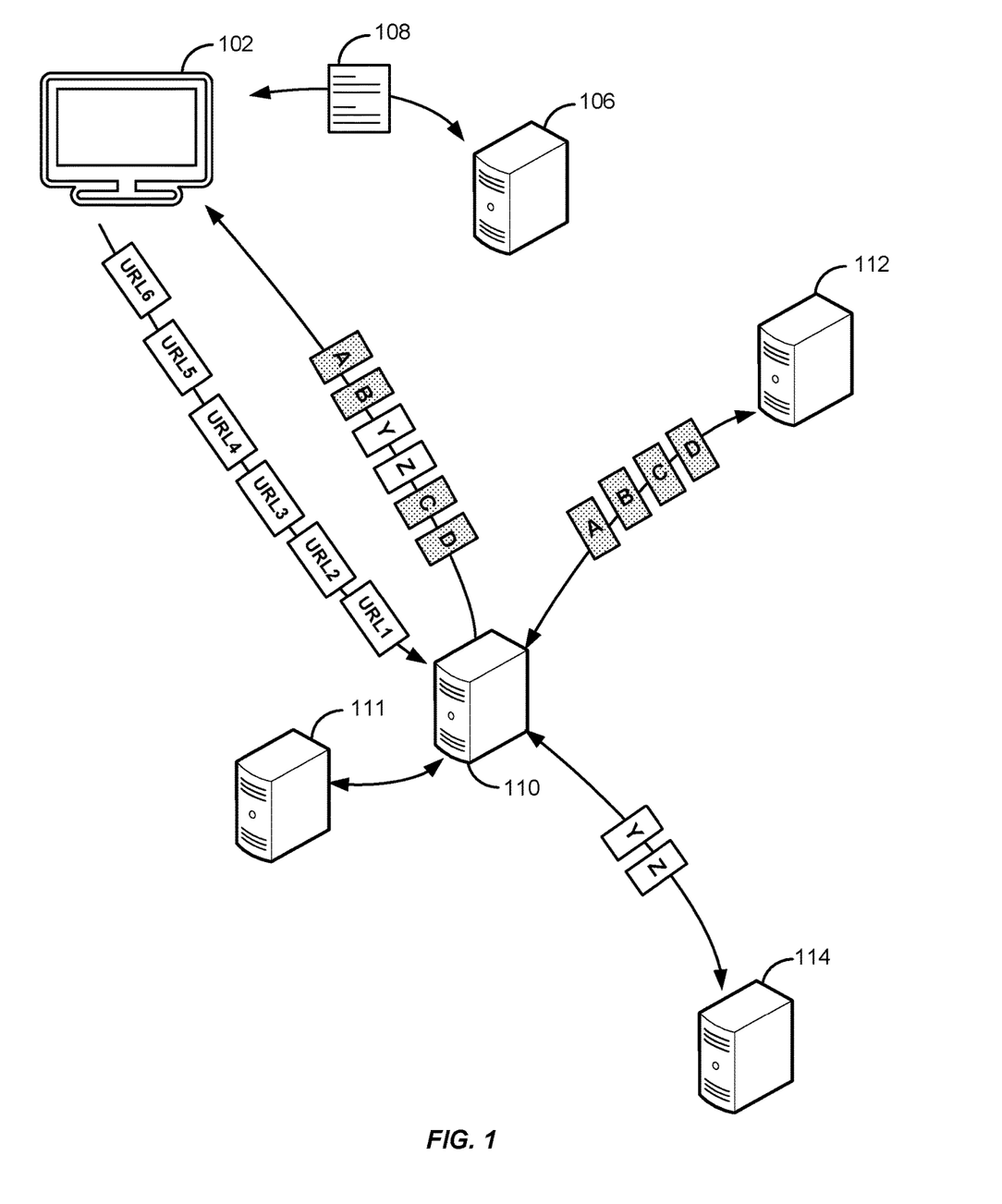
FIG. 1 illustrates an example of server-side insertion of content as enabled by the present disclosure.

FIG. 1 illustrates an example in which a client device 102 connects to a stream of a video presentation from a content service. The requested presentation might be, for example, a movie that includes several durations of advertising content distributed throughout the movie. A manifest service 106 of the content service provides manifest data 108 to client device 102 which then begins requesting fragments of the content from CDN edge server 110. Each request from client device 102 is directed to a URL (e.g., URL1-URL6) derived from manifest data 108 and specifies a corresponding content range of the presentation. For implementations employing the adaptive bitrate streaming technique known as Dynamic Adaptive Streaming over HTTP (DASH), the specified content range would be a byte range. For implementations employing Microsoft's Smooth Streaming, the specified content range is time-based.

Encoded in the URL for each request is a key that includes a sequence of bits for each duration of secondary content (referred to herein as an "interstitial") that defines the start point of the interstitial, the length of the interstitial, and the secondary content (e.g., advertising) for that interstitial. For DASH implementations, the start point and length of the interstitial is specified in bytes. For Smooth Streaming, these are specified based on time stamps. Edge server 110 extracts the key and determines whether the requested content range is included in any of the interstitials identified by the key. If not, edge server 110 checks its local cache 111 for the movie fragment corresponding to the requested content range. If the movie fragment is in the cache, edge server 110 retrieves it and provides it to client device 102. If not, edge server 110 requests the movie fragment from primary content origin 112, caches it, and provides it to client device 102.

If, on the other hand, the requested content range corresponds to one of the interstitials identified in the key, edge server 110 uses the information in the key to identify the secondary content for that interstitial and performs a cache lookup for the secondary content fragment and/or requests the secondary content fragment from the source of the secondary content, e.g., advertising content origin 114. The secondary content fragment is then cached and provided to client device 102.

From the perspective of the client device, the manifest data make no apparent distinction between content ranges that correspond to the primary content and content ranges that correspond to the secondary content. Each request generated by the client device uses the same URL root (which includes the key) and so appears to correspond to content from a single source. However, the content fragments corresponding to those requests actually originate from different sources (e.g., movie fragments A-D from server 112 and ad content fragments Y and Z from server 114). These are then delivered to client 102 for playback in the requested sequence (e.g., A, B, Y, Z, C, D). Thus, even though a client device or its media player may not have the capability of handling a composite manifest that identifies content from multiple sources, content fragments from different sources may still be provided to the client device in a way that is transparent to that device.

In addition, because the same key is included in the URL of each request (whether the request corresponds to a movie fragment or an ad fragment), more sophisticated devices and media players are unable to distinguish between requests for primary content and requests for secondary content. This might be useful, for example, for cases in which the client device has software designed to skip playback of advertising content.

Figure 2:
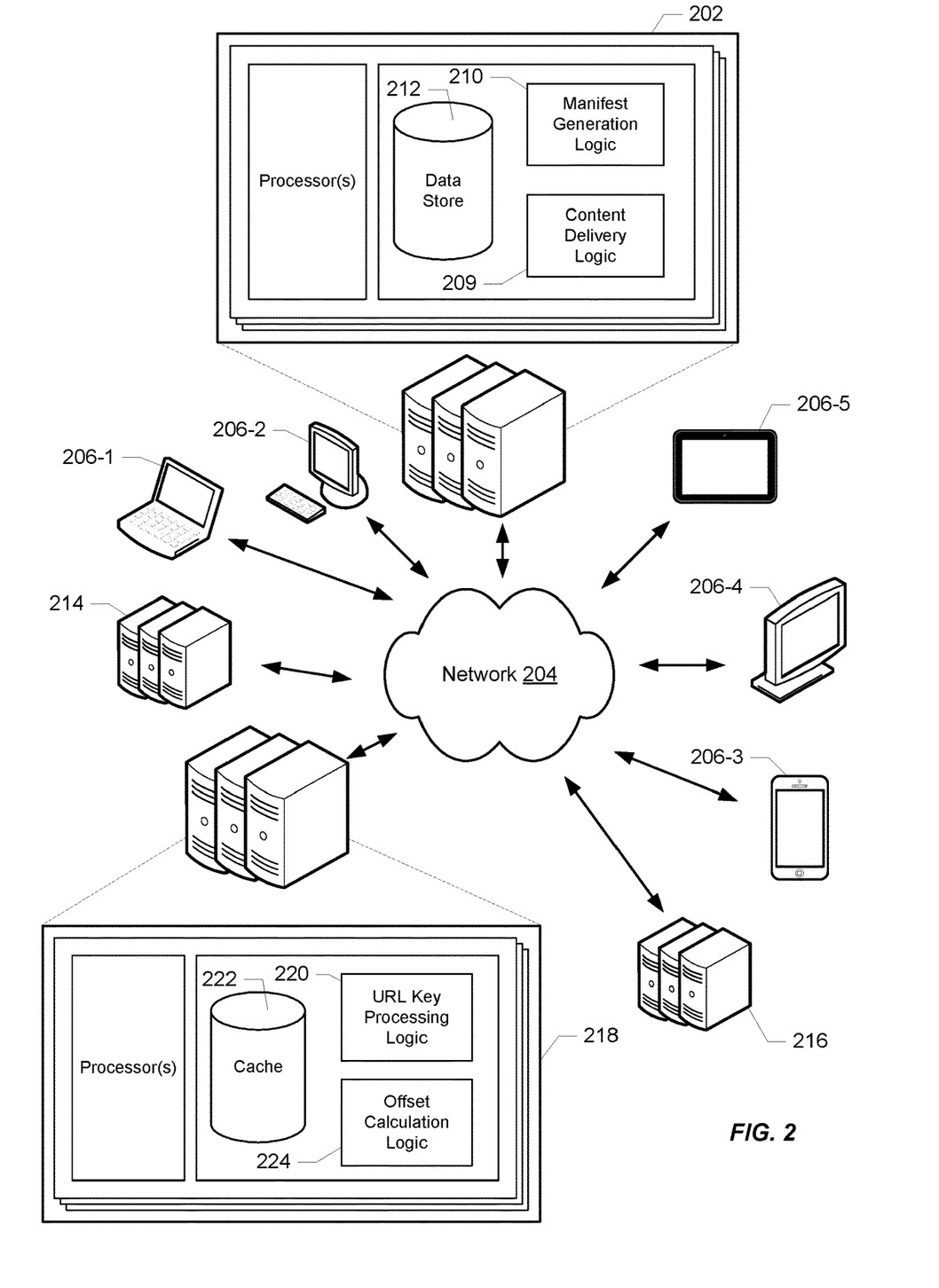
FIG. 2 illustrates a computing environment in which implementations enabled by the present disclosure may be implemented.

FIG. 2 illustrates an example of a computing environment in which a video content service 202 and a content delivery network (CDN) 218 provide streaming content (e.g., video and/or audio) via network 204 to a variety of client devices (206-1 through 206-5) in accordance with the techniques described herein. Content service 202 and CDN 218 may each conform to any of a wide variety of architectures such as, for example, a services platform deployed at one or more co-locations, each implemented with one or more servers. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 206 may be any suitable device capable of connecting to network 204 and consuming streaming content provided by service 202. Such devices may include, for example, mobile devices (e.g., cell phones, smart phones, and tablets), personal computers (e.g., laptops and desktops), set top boxes (e.g., for cable and satellite systems), smart televisions, smart home devices, personal digital assistants, gaming consoles, wearable computing devices, etc.

At least some of the examples described herein contemplate implementations based on computing models that enable ubiquitous, convenient, on-demand network access to a shared pool of computing resources (e.g., networks, servers, storage, applications, and services) to provide streaming content. As will be understood, such computing resources may be integrated with and/or under the control of the same entity, e.g., the entity or entities controlling content service 202 and CDN 218. Alternatively, such resources may be independent of content service 202 and/or CDN 218, e.g., on a platform under control of a separate provider of computing resources with which content service 202 and/or CDN 218 connect to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular streaming protocols herein are merely by way of example. Suitable alternatives known to those of skill in the art may be employed.

In the depicted example, content service 202 provides access to content that may originate from multiple sources (e.g., as represented by primary content origin servers 214 and secondary content origin servers 216) in conjunction with one or more content delivery networks (e.g., CDN 218). As will be appreciated, content service 202 may be integrated to varying degrees with the platforms and/or networks in which the content origin servers and/or CDN(s) operate. For example, one or more origin servers may be integrated with or in the same co-location facility or data center as the content service. Alternatively, origin servers may be in facilities that are remote from that in which the content service operates. In another example, an origin server may be in the same network or facility as the CDN that is streaming its content. The range of variations known to those of skill in the art are contemplated to be within the scope of this disclosure.

Content service 202 includes logic that facilitates at least some aspects of the delivery of streaming content to client (e.g., as represented by content delivery logic 209). Content service 202 may also include logic for generating manifest data as described herein (e.g., logic 210). In addition to these functions, content service 202 may also include a variety of information related to the streaming content (e.g., associated metadata and master manifest data) in data store 212 to which service 202 provides access. Alternatively, such information about the streaming content, as well as the streaming content itself may be provided and/or hosted by one or more separate platforms, e.g., origin servers 214 and 216, and/or CDN 218. It should be noted that, while logic 210 and data store 212 are contemplated as integrated with content service 202, implementations are contemplated in which either or both operate remotely from the associated content service. From these examples, those of skill in the art will understand the diversity of use cases to which the techniques described herein are applicable.

In the depicted example, CDN 218 includes logic for determining whether content requests received from client devices 206 correspond to primary content or secondary content (e.g., logic 220) and getting the requested content from the corresponding origin (e.g., servers 214 or 216) if the content is not available in its local cache 222. As will be described, CDN 218 may also include logic for determining offsets (e.g., in bytes or time stamps) for secondary content (e.g., logic 224).

Figure 3:
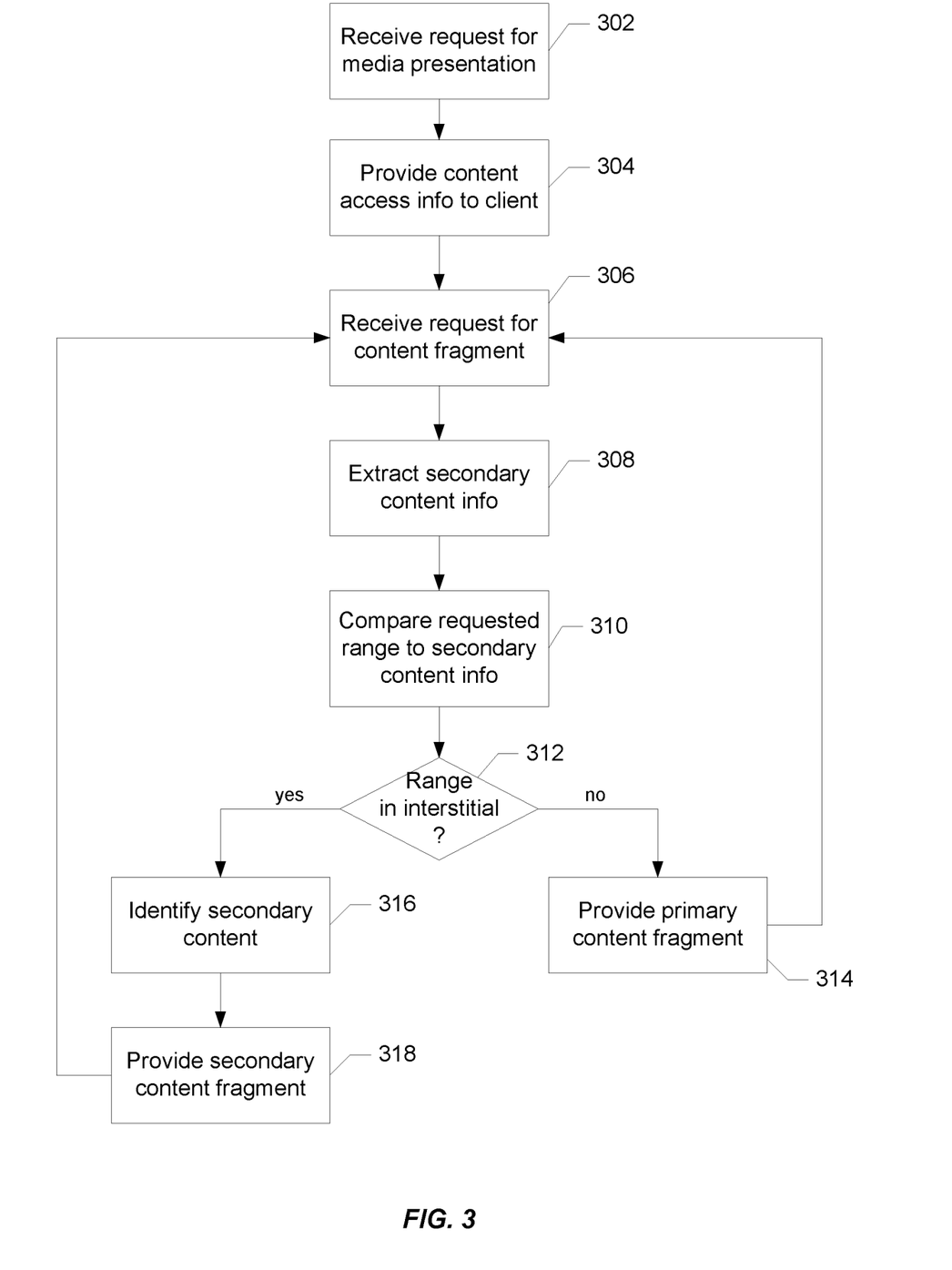
FIG. 3 is a flowchart illustrating operation of a particular implementation enabled by the present disclosure.

Operation of a specific implementation will now be described with reference to the flow diagram of FIG. 3. A client device (e.g., any of client devices 206) sends a request (e.g., an HTTP request) to a streaming content service for playback of a selected media presentation (302). In response to the request, the content service provides the client device with the information the client device needs to acquire a stream of the content or to download the content (304). This may include, for example, one or more DRM licenses, a decryption key, content metadata, and manifest data with which the client device can generate properly formatted requests for fragments of the media presentation at various quality levels. The type of manifest requested will correspond to the adaptive bitrate streaming protocol used by the client device, e.g., Microsoft's Smooth Streaming, Dynamic Adaptive Streaming over HTTP (DASH), etc.

The client uses the manifest data to generate requests for content fragments to specific URLs that correspond to successive ranges of content identified in the manifest data (306). Typically, the URLs will correspond to a particular CDN, a set of CDN servers, or even a particular edge server of a CDN. According to various implementations enabled by the present disclosure, each URL includes a key that encodes one or more periods of secondary content included within the media presentation. The key identifies the starting location and the duration of each such period (referred to herein as an "interstitial"). The key may also identify the specific secondary content included in each period. As discussed above, an example of secondary content is advertising content. However, it should be noted that any type of content from one or more sources may be inserted in a media presentation as described herein.

Figure 4:
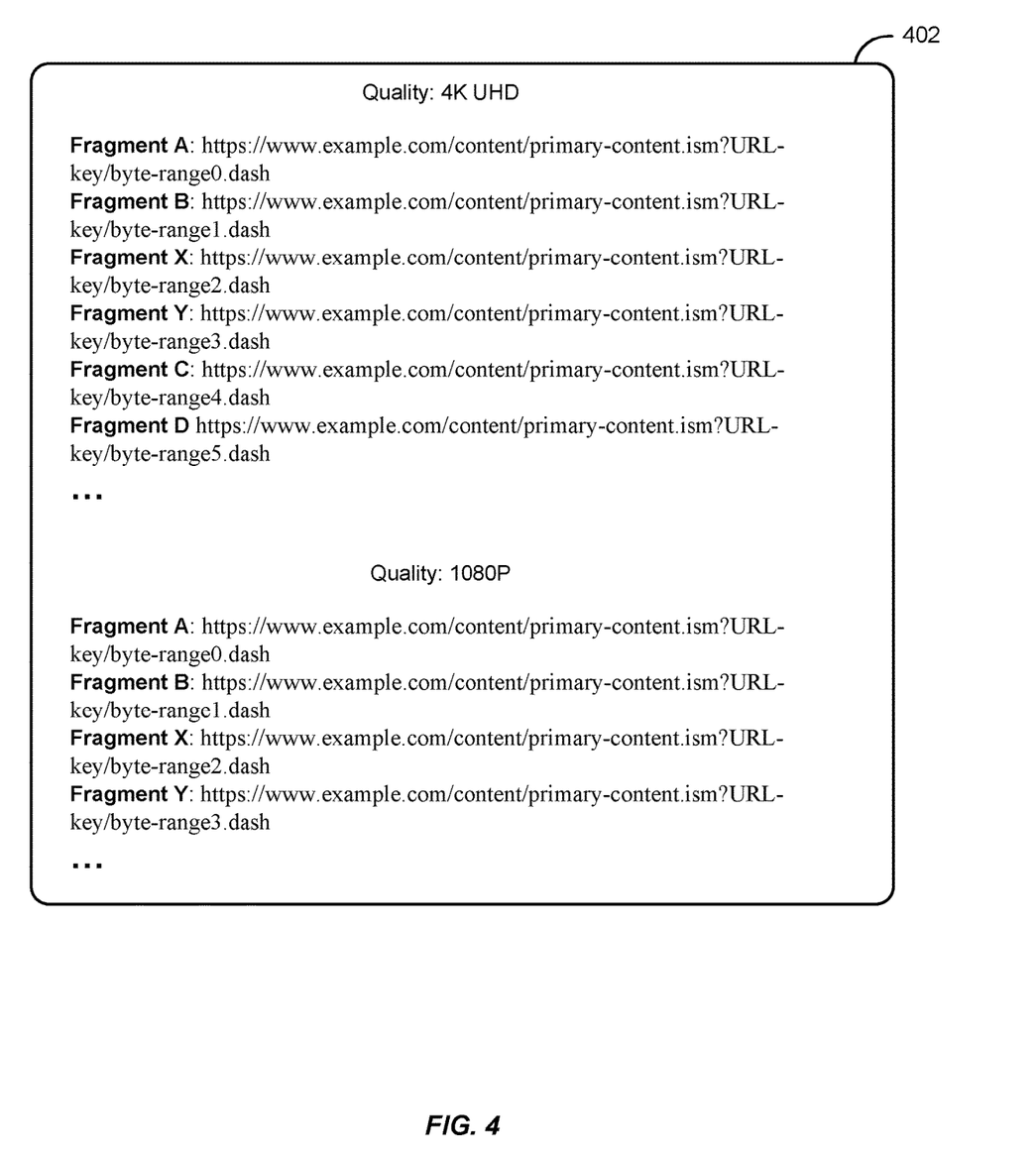
FIG. 4 shows an example of manifest data for use with implementations enabled by the present disclosure.

FIG. 4 provides an illustration of manifest data that includes secondary content information encoded in each URL. As will be appreciated, the information in manifest data 402 is represented in a simplified way for the purpose of illustrating the functionality enabled by the present disclosure rather than as an accurate or literal representation of manifest data as it would be represented in an actual manifest. As shown, manifest data 402 includes URLs for a sequence of content fragments of the media presentation at different quality levels, e.g., 4K UHD, 1080P, etc. For each quality level, the sequence of fragments represented corresponds to the same portions of the media content but at the respective quality levels. The example depicted in FIG. 4 uses the same fragment references for the primary and secondary content used in the example described above with reference to FIG. 1 in which the sequence of fragments is given by A-B-X-Y-C-D, with fragments A-D corresponding to primary content and fragments X and Y corresponding to secondary content. The labels "Fragment A," "Fragment B," etc., are only provided in the figure for illustrative purposes and typically would not be present in the manifest data.

The roots of the URLs in manifest data 402 are the same with each including a range of bits designated "URL-key" encoding one or more interstitial periods of secondary content within the presentation of the primary content. Each successive URL for a given quality level specifies a different content range. The example of FIG. 4 assumes a DASH implementation so the content ranges are specified as byte ranges, e.g., byte-range0 through byte-range5. Even though the content fragments may be from multiple sources, the consistent representation of the URLs in manifest data 402 gives the appearance that the content fragments are all part of the same media presentation originating from a single source. As will be appreciated by those of skill in the art, other fields within the URLs for a given quality level may also differ relative to the corresponding URLs for other quality levels (e.g., resolution, bit rate, etc.) without departing from the scope of this disclosure.

According to a particular class of implementations, the bits included in the URL key indicate a start point and a duration or length of each interstitial period of secondary content within the media presentation. For DASH implementations, each interstitial start point may identify the first byte of the interstitial and the duration of the interstitial in bytes. For Smooth Streaming, these would be identified based on time stamps of the media timeline for the media presentation. The URL key may also include a range of bits that identifies the particular secondary content (e.g., advertising content) that is to be presented in the interstitial. This may include a file index that represents the possible variants of the content, and a secondary content identifier that represents the secondary content itself. For example, there might be as many as 10 different video encodings of a particular advertisement and many different languages and quality levels for the audio. The file index allows for identification of each of the available variants.

As will be appreciated, the allowable length of fragment URLs may be limited as specified by the particular protocol. According to a particular DASH implementation, the interstitial start point is specified using 36 bits. For a maximum bitrate of 15 Mb/second, for example, this could support the specification of a start point at any byte in approximately 10 hours of content. According to the same implementation, the duration or length of an interstitial is specified using 31 bits. At 15 Mb/second, this supports an interstitial length of approximately 19 minutes. According to the same implementation, the file index and the secondary content identifier are specified using 10 bits and 28 bits, respectively. This allows for the specification of 1024 file indices and, given 27 different variants for each secondary content, nearly 10 million unique secondary content (e.g., ads). According to a more specific implementation, a number of bits can be reserved to identify the format of the URL key so that multiple key formats can be used to suit particular applications.

According to one variation of the DASH implementation used for the insertion of advertising content, an interstitial can be specified in the URL key for each individual ad. According to another variation, the size of the URL key can be reduced by including multiple ads in an interstitial and only specifying the beginning of the interstitial once. So, for example, if each ad is represented by an "A" and primary content by a "P," a portion of a media presentation might be represented by the sequence PPPP AAA PPPP AAAA PPPP AA PPPP in which there are three interstitial represented, the first with three ads, the second with four, and third with two.

The three interstitials could be represented using the following numbers of bits in which each bracketed set of numbers corresponds to one ad:

[1 36 31 10 28][0 31 10 28][0 31 10 28]- - - [1 36 31 10 28][0 31 10 28] [0 31 10 28][0 31 10 28]- - - [1 36 31 10 28][0 31 10 28]

The beginning of each interstitial (the first bracketed set of numbers in each of the 3 groups) is indicated by a "1" followed by the 36-bit specification of the interstitial start point. The next 31 bits specifies the duration of the ad. These bits are followed by the 10 and 28-bit specifications of the ad index and the ad identifier. Note that each successive ad in a given interstitial includes a "0" in the first bit location to indicate that it is part of an ongoing interstitial (e.g., as specified by a previous bracketed sequence). Also note that the successive ads in each interstitial do not include the 36-bit sequence specifying the start point. Thus, even though additional bits are included to distinguish between the beginning of the interstitial and the beginning of a particular ad in the interstitial, significant savings in the number of bits in the overall key can be realized (in this example, 35 bits for each ad after the first ad in the interstitial).

Referring back to FIG. 3, for each content request received from the client device, the URL key is extracted from the request (308) (e.g., by logic on the CDN edge server) and compared to the content range specified by the content request (310). If the requested content range does not coincide with one of the interstitials specified by the URL key (312), the primary content fragment corresponding to that content range is provided to the requesting client (314). As will be appreciated, this may involve a CDN cache lookup and/or an additional request for the fragment from the CDN to a primary content origin server.

If, on the other hand, the requested content range does coincide with one of the interstitials specified by the URL key (312), the secondary content corresponding to the requested content range is identified (316) (e.g., by the logic on the CDN) and provided to the requesting client (318). As with the primary content, this may involve a CDN cache lookup and/or an additional request from the CDN to a secondary content origin server.

According to some implementations and as described above, the URL key extracted from the request may identify the secondary content such that, for example, logic on a CDN edge server can directly determine from the URL key whether that content is in a local cache and, if not, generate a request to the secondary content source. According to other implementations, the identification of the secondary content may be more indirect. For example, the secondary content for a given interstitial might be identifiable (e.g., by the logic on the CDN) using a combination of information to perform a lookup that identifies the secondary content. One example would be to use the primary content (e.g., the movie title or show episode) in combination with the content range requested as the lookup index. So, for a given content range within a particular media presentation that corresponds to a particular interstitial, an external lookup could supply the secondary content rather than having to specify it in the URL key. Variations on this theme apparent to those of skill in the art are within the scope of this disclosure. Such an approach would not only reduce the amount of information specified in the URL key, but could also provide flexibility regarding what secondary content is inserted in a given presentation and when that decision is made. That is, the URL key can remain the same, but the secondary content to which it maps could be changed by modifying the lookup mapping.

According to some implementations, an offset determination is made (e.g., by the logic on the CDN) to ensure that the correct content range of the secondary content is requested based on the content range requested by the client device. That is, secondary content inserted among the primary content of a media presentation as described herein assigns content ranges (e.g., byte ranges or time-based ranges) to the interstitials that don't correspond to the actual content ranges of the secondary content as assigned by the source of the secondary content. For example, advertising content might be inserted beginning at the nth byte of a media presentation, but the first byte of the ad content might be designated by its source as byte 0. Therefore, when a secondary content fragment is retrieved (e.g., from its origin server or a local CDN cache), the content range associated with the request is mapped to the correct content range of the secondary content. For example, a request from a client might specify a byte range of 100 to 200 which, based on the URL key, is determined to coincide with an interstitial with a start point at byte 100 and a duration of 1000. The requested byte range (100-200) is mapped to the byte range of the secondary content (0-100) so that a proper request or cache lookup for the secondary content can be generated.

Figure 5:
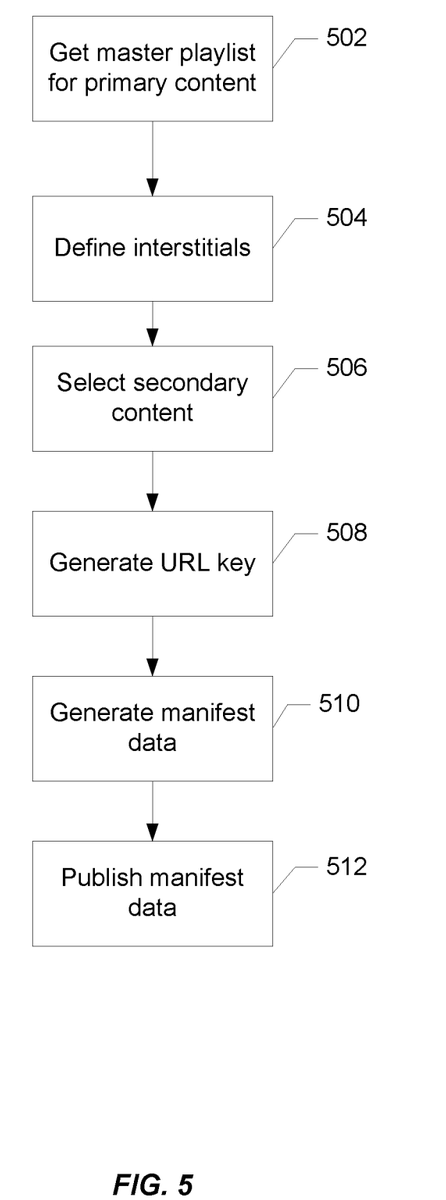
FIG. 5 is a flowchart illustrating operation of a particular implementation enabled by the present disclosure.

FIG. 5 is a flowchart illustrating generation of manifest data as enabled by the present disclosure. As will be appreciated, this may be done by logic associated with a content service (e.g., manifest generation logic 210 of FIG. 2) and/or part of a separate but associated manifest data service (e.g., manifest service 106 of FIG. 1). A master playlist for the primary content is obtained (502). A plurality of interstitials are defined by modifying the master playlist to include gaps for selected content ranges between content ranges corresponding to the primary content (504). This involves modifying the content ranges originally associated with primary content fragments in the master playlist.

One or more durations of secondary content are selected for insertion in each of the interstitials defined in the master playlist (506). Secondary content information (e.g., a URL key) is generated based on the interstitials defined in the master playlist (508). As discussed above, this secondary content information may explicitly or implicitly identify the secondary content selected for insertion. Manifest data including URLs that encode the secondary content information are generated for each of the content ranges specified in the master playlist (510). The manifest data are then published to support streaming of the media presentation (512). As discussed above, logic configured to process requests based on this manifest data uses the secondary content information to determine whether a requested content range corresponds to primary content or secondary content, and then takes appropriate action to provide the correct content fragment to the requesting client.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
providing manifest data to a client device, the manifest data representing a video content presentation including primary content and advertising content, the manifest data specifying a plurality of uniform resource locators (URLs), each of the URLs specified by the manifest data encoding advertising content information, the advertising content information specifying one or more ranges of content corresponding to one or more interstitial periods of the advertising content within the primary content of the video content presentation;
receiving, with a server of a content distribution network (CDN), a first content request from the client device via a network, the first content request specifying a first URL of the plurality of URLs and corresponding to a first content range;
comparing the first content range to each of the one or more interstitial periods specified in the advertising content information to determine that the first content request corresponds to the primary content;
retrieving a primary content fragment corresponding to the first content range from a server associated with a first content origin via the network;
storing a copy of the primary content fragment in a cache memory of the CDN;
transmitting the primary content fragment from the server of the CDN to the client device via the network in response to the first content request;
receiving, with the server of the CDN, a second content request from the client device via the network, the second content request specifying a second URL of the plurality of URLs and corresponding to a second content range;
comparing the second content range to each of the one or more interstitial periods specified in the advertising content information to determine that the second content request corresponds to the advertising content;
retrieving an advertising content fragment corresponding to the second content range from a server associated with a second content origin via the network, the second content origin being different than the first content origin; and
transmitting the advertising content fragment from the server of the CDN to the client device via the network in response to the second content request.

2. The method of claim 1, wherein the first and second content requests conform to the Dynamic Adaptive Streaming over HTTP (DASH) specification and the first and second content ranges are byte ranges, or wherein the first and second content requests conform to the Smooth Streaming specification and the first and second content ranges are time ranges.

3. The method of claim 1, further comprising determining an offset for the advertising content fragment based on the advertising content information.

4. A system, comprising one or more computing devices configured to:
- receive a first content request from a client device via a network, the first content request specifying a first uniform resource locator (URL) and corresponding to a first content range, the first URL encoding secondary content information, the secondary content information specifying one or more ranges of content corresponding to one or more interstitial periods of secondary content within a media presentation including primary content;
- determine that the first content request corresponds to the primary content based on the first content range and the secondary content information;
- transmit a primary content fragment to the client device via the network, the primary content fragment originating from a first content origin;
- receive a second content request from the client device via the network, the second content request specifying a second URL and corresponding to a second content range, the second URL encoding the secondary content information;
- determine that the second content request corresponds to the secondary content based on the second content range and the secondary content information; and
- transmit a secondary content fragment to the client device via the network, the secondary content fragment originating from a second content origin that is different from the first content origin.

5. The system of claim 4, wherein the one or more computing devices are configured to determine that the second content request corresponds to the secondary content by determining that the second content range is within a corresponding one of the one or more interstitial periods specified in the secondary content information.

6. The system of claim 4, wherein the first and second content ranges are byte ranges, or wherein the first and second content ranges are time ranges.

7. The system of claim 4, wherein the one or more computing devices are further configured to transmit manifest data to the client device, the manifest data specifying a plurality of URLs including the first and second URLs, and wherein each of the URLs specified by the manifest data encodes the secondary content information.

8. The system of claim 4, wherein the one or more computing devices are further configured to determine an offset for the secondary content fragment based on the secondary content information.

9. The system of claim 4, wherein the secondary content information specifies, for each of the one or more interstitial periods, an interstitial period start point, an interstitial period duration, and a secondary content identifier.

10. The system of claim 9, wherein a first interstitial period of the one or more interstitial periods corresponds to a plurality of durations of secondary content originating from different sources, and wherein the secondary content information for the first interstitial period specifies the corresponding interstitial period start point only once for the first interstitial period.

11. A computer-implemented method, comprising:
- receiving a first content request from a client device via a network, the first content request specifying a first uniform resource locator (URL) and corresponding to a first content range, the first URL encoding secondary content information, the secondary content information specifying one or more ranges of content corresponding to one or more interstitial periods of secondary content within a media presentation including primary content;
- determining that the first content request corresponds to the primary content based on the first content range and the secondary content information;
- transmitting a primary content fragment to the client device via the network, the primary content fragment originating from a first content origin;
- receiving a second content request from the client device via the network, the second content request specifying a second URL and corresponding to a second content range, the second URL encoding the secondary content information;
- determining that the second content request corresponds to the secondary content based on the second content range and the secondary content information; and
- transmitting a secondary content fragment to the client device via the network, the secondary content fragment originating from a second content origin that is different from the first content origin.

12. The method of claim 11, wherein determining that the second content request corresponds to the secondary content includes determining that the second content range is within a corresponding one of the one or more interstitial periods specified in the secondary content information.

13. The method of claim 11, wherein the first and second content ranges are byte ranges, or wherein the first and second content ranges are time ranges.

14. The method of claim 11, further comprising transmitting manifest data to the client device, the manifest data specifying a plurality of URLs including the first and second URLs, and wherein each of the URLs specified by the manifest data encodes the secondary content information.

15. The method of claim 11 further comprising determining an offset for the secondary content fragment based on the secondary content information.

16. The method of claim 11, wherein the secondary content information specifies, for each of the one or more interstitial periods, an interstitial period start point, an interstitial period duration, and a secondary content identifier.

17. The method of claim 16, wherein a first interstitial period of the one or more interstitial periods corresponds to a plurality of durations of secondary content originating from different sources, and wherein the secondary content information for the first interstitial period specifies the corresponding interstitial period start point only once for the first interstitial period.

18. A system, comprising one or more computing devices configured to:
- receive primary content manifest data representing a plurality of primary content fragments of primary content originating from a first content origin;
- receive secondary content manifest data representing a plurality of second content fragments of secondary content originating from a second content origin, the second content origin being different than the first content origin;
- generate presentation manifest data representing a media presentation including both the primary content and the secondary content, the presentation manifest data specifying a plurality of uniform resource locators (URLs), each of the URLs corresponding to one of the primary content fragments or one of the secondary content fragments, each of the URLs encoding secondary content information, the secondary content information specifying one or more ranges of content corresponding to one or more interstitial periods of the secondary content within the primary content of the media presentation; and transmit the presentation manifest data to a client device in response to a request from the client device to download or stream the media presentation.

19. The system of claim 18, wherein the one or more interstitial periods correspond to one or more byte ranges, or wherein the one or more interstitial periods correspond to one or more time ranges.

20. The system of claim 18, wherein the secondary content information specifies, for each of the one or more interstitial periods, an interstitial period start point, an interstitial period duration, and a secondary content identifier.

* * * * *